United States Patent
Jung et al.

(10) Patent No.: US 11,461,230 B2
(45) Date of Patent: Oct. 4, 2022

(54) PIPELINED DATABASE QUERY PROCESSING FOR INSERT QUERY

(71) Applicant: SAP SE, Walldorf (DE)

(72) Inventors: SungGun Jung, Anyang (KR); Yuchon Yi, Yongin-si (KR); Eun Kyung Chi, Seoul (KR); Taesik Yoon, Seoul (KR)

(73) Assignee: SAP SE, Walldorf (DE)

(*) Notice: Subject to any disclaimer, the term of this patent is extended or adjusted under 35 U.S.C. 154(b) by 289 days.

(21) Appl. No.: 16/785,443

(22) Filed: Feb. 7, 2020

(65) Prior Publication Data

US 2021/0248071 A1 Aug. 12, 2021

(51) Int. Cl.
*G06F 12/06* (2006.01)
*G06F 16/22* (2019.01)
*G06F 16/23* (2019.01)

(52) U.S. Cl.
CPC ...... *G06F 12/0646* (2013.01); *G06F 16/2282* (2019.01); *G06F 16/2386* (2019.01); *G06F 2212/1044* (2013.01)

(58) Field of Classification Search
CPC ............... G06F 9/30087; G06F 9/3834; G06F 12/0646; G06F 16/2282; G06F 16/2379; G06F 16/2386
USPC ........................................................ 707/713
See application file for complete search history.

(56) References Cited

U.S. PATENT DOCUMENTS

| | | | |
|---|---|---|---|
| 7,509,359 B1* | 3/2009 | Bruso | G06F 16/284 |
| 2016/0147637 A1* | 5/2016 | Bhagavan | G06F 11/3664 |
| | | | 717/127 |
| 2018/0136971 A1* | 5/2018 | Dong | G06F 9/4856 |

OTHER PUBLICATIONS

SAP HANA Platform SPS 12, Version 1.2, Jan. 24, 2018, 1362 pages.
SAP HANA Smart Data Access, pp. 1218-1220 of SAP HANA Platform SPS 12, Version 1.2, Jan. 24, 2018.

* cited by examiner

*Primary Examiner* — Hung T Vy
(74) *Attorney, Agent, or Firm* — Fountainhead Law Group P.C.

(57) ABSTRACT

In some embodiments, a method receives a query to retrieve data from a source table and insert the data into a target table and allocates a size of memory. A portion of the data from the source table is retrieved based on the size of memory and stored in the memory. Then, the method stores the retrieved portion of the data stored in the memory into the target table and continues to retrieve portions of data from the source table in increments based on the size of memory, store the retrieved portions of data in the memory, and store the retrieved portions of data from the memory in the target table until the data from the source table has been inserted into the target table.

20 Claims, 6 Drawing Sheets

PIPELINED DATABASE QUERY PROCESSING FOR INSERT QUERY

BACKGROUND

A query to a database may copy data from a source table to a target table. For example, a query may copy all the columns from a source table to a target table. To perform the copy operation, a database system may fetch the data of all the columns from the source table. Then, the database system inserts the retrieved data into the target table. When the source table is located at a remote source, the database system may allocate memory locally for the entire source table. That is, the database system allocates memory at least equal to the amount of data found in the source table that is to be inserted into the target table. Then, the database system fetches the data from the source table and stores the data in the allocated memory. After which, the database system inserts the data into the target table. If the source table includes a large amount of data, the database system requires a large amount of local memory. However, when the database system is located on a cloud system, the amount of local memory available to the database system may be limited or may be expensive to use.

DETAILED DESCRIPTION

Described herein are techniques for a database system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments process a query, such as an insert statement that fetches data from a source table and inserts the data into a target table, using a pipelined search. In some embodiments, the query may include an "INSERT-subSELECT" statement that selects data from a source table to insert into a target table. In some embodiments, the source table may be a remote source to a database server. The pipelined search may allocate a pre-defined chunk size in memory. Then, in the pipelined search, the database system may fetch the pre-defined chunk size from the source table multiple times. At each iteration of the pipelined search, the database system may store the fetched chunk size of data from the source table in memory and then insert the data into the target table. The database system may then clear the memory of the inserted data. After which, the database system performs another fetch of data of the pre-defined chunk size from the source table. The database system performs the iterations multiple times until the required data from the source table has been inserted into the target table thus forming a pipelined search.

Using the pipelined search, the database system allocates the pre-defined chunk size of memory, which is smaller than the entire size of the source table. This saves memory that is required to perform the INSERT-subSELECT operation compared to allocating the entire size of the source table in memory. Further, performing the pipelined search may be almost as fast as when performing a bulk transfer of the entire source table to memory, and then inserting the entire source table into the target table. The time may be substantially equivalent because even though the number of fetches is increased, the smaller amount of data may be transferred faster than the entire source table at once.

System Overview

Figure 1:
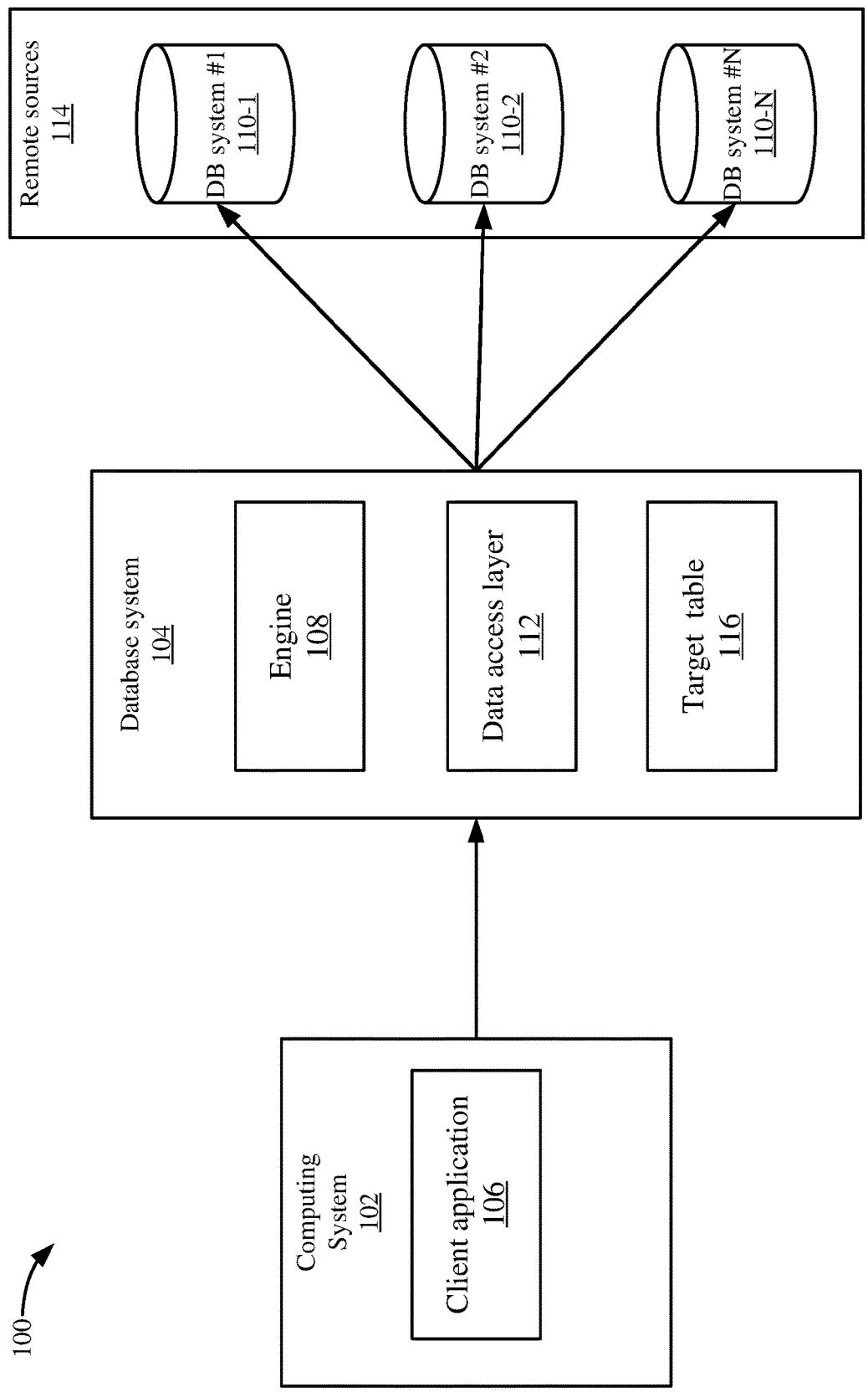
FIG. 1 depicts a simplified system for performing database operations according to some embodiments.

FIG. 1 depicts a simplified system 100 for performing database operations according to some embodiments. System 100 includes a computing system 102, a database system 104, and remote sources 114.

Computing system 102 may include a client application 106 that may perform queries using database system 104. For example, client application 106 may send a query that may include an operation for database system 104 to perform. In some embodiments, the query may include an insert statement, such as an INSERT-subSELECT statement, that may insert data from a source table into a target table. Although an INSERT-subSELECT statement is described, the statement may be referred to by different names. Also, the described operations may be applied to any insert statement that retrieves data from a source table and inserts the data into a target table.

Database system 104 may include one or more computing devices that may process the query. In processing the query, database system 104 may perform the INSERT-subSELECT statement to copy data from the source table to the target table. The INSERT-subSELECT statement copies data from the result of searching in subSELECT clause. The statement copies data from a source table, but can also copy data from multiple source tables. In case of table copy, the statement may be changed to 'INSERT <target_table>SELECT * FROM <src_table>', which copies from a source table <src_table> to a target table <target_table>. The statement supports both single table and multiple table insertion in subSELECT clause.

Database system 104 includes an engine 108 that may process the INSERT-subSELECT statement. Additionally, a data access layer 112 may access remote database systems #1 to #N 110-1 to 110-N in remote sources 114 to perform the query. In some embodiments, data access layer 112 may be an interface for accessing data stored remotely in remote sources 114, which may be of different formats. For example, remote database systems #1 to #N may be associated with different database vendors that may store data in different formats. Remote database systems 110 may be data that is accessed over a network as opposed to data stored locally on a local area network. Although remote sources are described, the source table may be stored locally, but in different formats.

Data access layer 112 may create a virtual table mapping to tables located in remote database systems 110. Then, data access layer 112 may access the data in remote database systems 110 by accessing a virtual table. Data access layer 112 may manipulate the virtual table just like an ordinary table that may be stored locally. Data access layer 112 may abstract the drivers that are needed to access the data in remote database systems 110, such as open database connectivity (ODBC) drivers that are used as an interface to access remote database systems 110. For example, the drivers may translate between client application 106 and remote database systems 110. Through the virtual table, data access layer 112 can access tables in remote database systems 110 just as if the tables are local tables.

In some embodiments, when a source table is created in a remote database system 110 of a remote source 114, data access layer 112 creates a virtual table to access the remote source table. Then, data access layer 112 can access the remote source table similar to a local table via the virtual table.

Target table 116 may be stored in storage that is local to database system 104. For example, engine 108 retrieves data from a source table in one of remote database systems 110, and then inserts the retrieved data into target table 116. Although target table 116 is discussed as local to database system 104, target table 116 may be located remotely from database system 104. That is, database system 104 may access the source table in remote database system 110, and then store the retrieved data in a target table 116 in another remote database system 110-2 in remote sources 114.

When performing the INSERT-subSELECT query, data access layer 112 copies the data via the virtual table to access the remote source table. For example, if the source table includes 10,000,000 rows with five columns, 54 gigabytes of memory may be required to be allocated to transfer the source table to the target table. In a cloud environment, database system 104 may not have 54 gigabytes of memory available to allocate. Accordingly, database system 104 uses the pipelined search where a smaller amount of memory is allocated and consecutive fetches of data are used, which will be described in more detail below.

Query Processing

Figure 2:
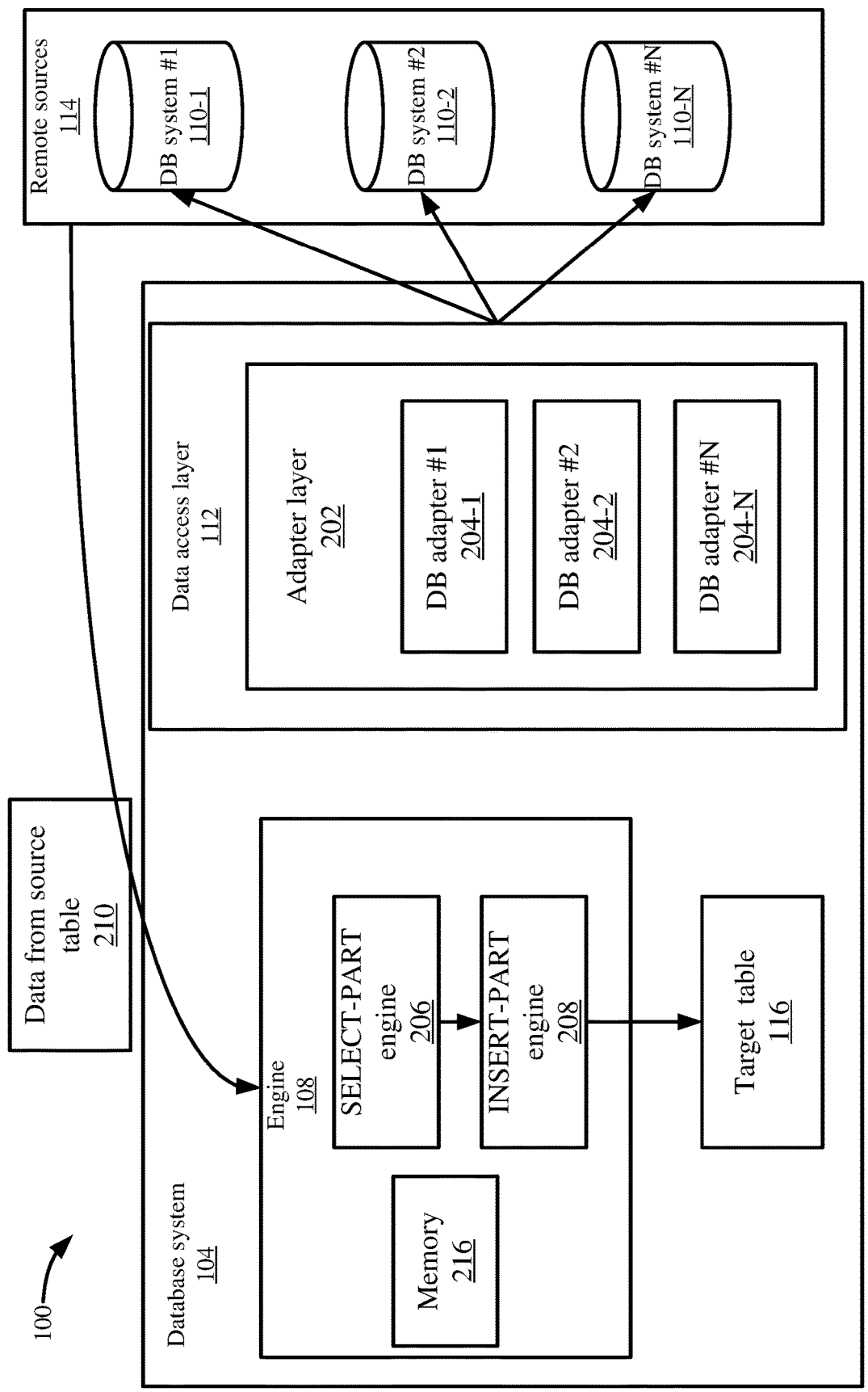
FIG. 2 depicts a more detailed example of system for processing an INSERT-subSELECT statement according to some embodiments.

FIG. 2 depicts a more detailed example of system 100 for processing an INSERT-subSELECT statement according to some embodiments.

In data access layer 112, an adapter layer 202 includes database (DB) adapters #1 to #N 204-1 to 204-N. Each database adapter 204 may be associated with a different format of a database system 110. For example, database adapter #1 204-1 may be associated with remote database system #1 110-1, database adapter #2 204-2 may be associated with remote database system #2 110-2, etc. Each database adapter may abstract the format, such as a database vendor's behavior, such that database access layer 112 can access different database systems of different formats. Accordingly, engine 108 does not have to understand the different formats of database systems 110 or the behavior of performing a query to data stored in each different database system 110.

Engine 108 receives a query from client application 106 that includes an INSERT-subSELECT statement. A SELECT-PART engine 206 may perform the INSERT-sub-SELECT query via data access layer 112 by first retrieving data from source table at 210. Then, SELECT-PART engine 206 stores the fetched data in a memory 216, which may be local to database system 104. After storing the fetched data in memory 216, an INSERT-PART engine 208 may insert the fetched data into target table 116.

Figure 3:
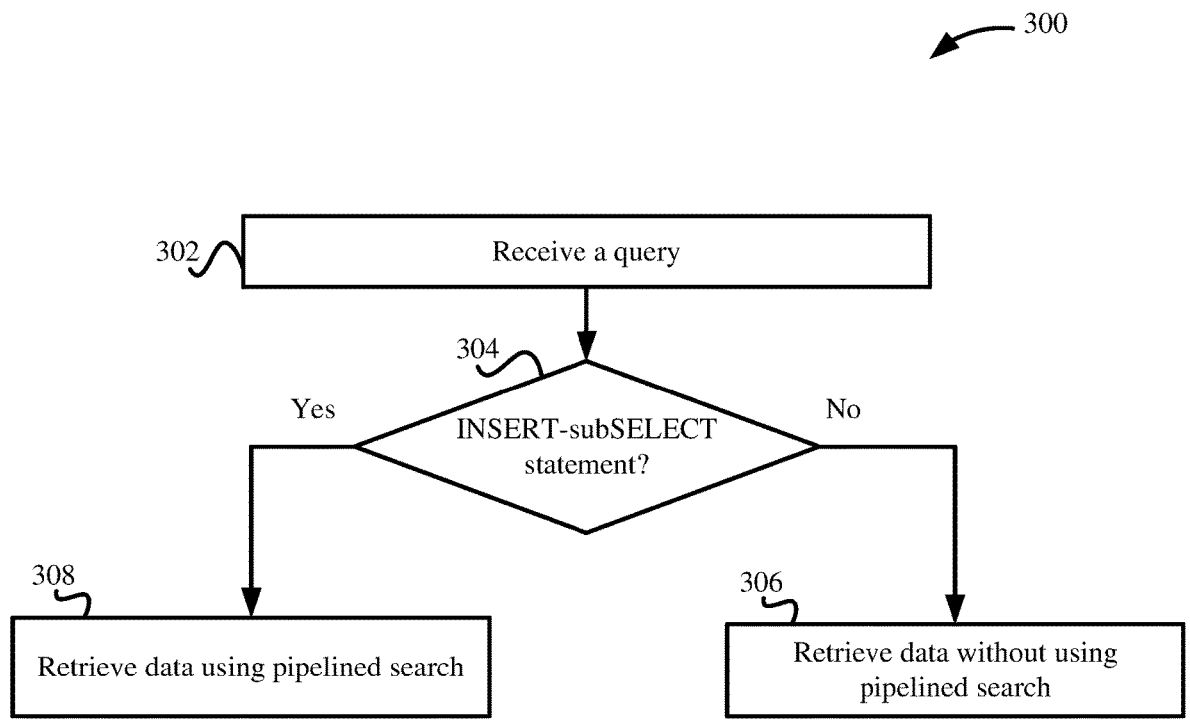
FIG. 3 depicts a simplified flowchart of a method for processing a query according to some embodiments.

The functionality may be different when retrieving data using different statements. FIG. 3 depicts a simplified flowchart 300 of a method for processing a query according to some embodiments. At 302, engine 108 receives a query.

At 304, engine 108 determines whether an INSERT-subSELECT statement has been included in the query. If not, at 306, engine 108 retrieves the data from the source table without using a pipelined search. For example, memory does not need to be allocated.

However, if the INSERT-subSELECT statement is found in the statement, then, at 308, engine 108 retrieves the data using the pipelined search. Engine 108 may perform the pipelined search when the source table is a local table or a remote table. The following will describe the method performed when using the pipelined search.

Figure 4:
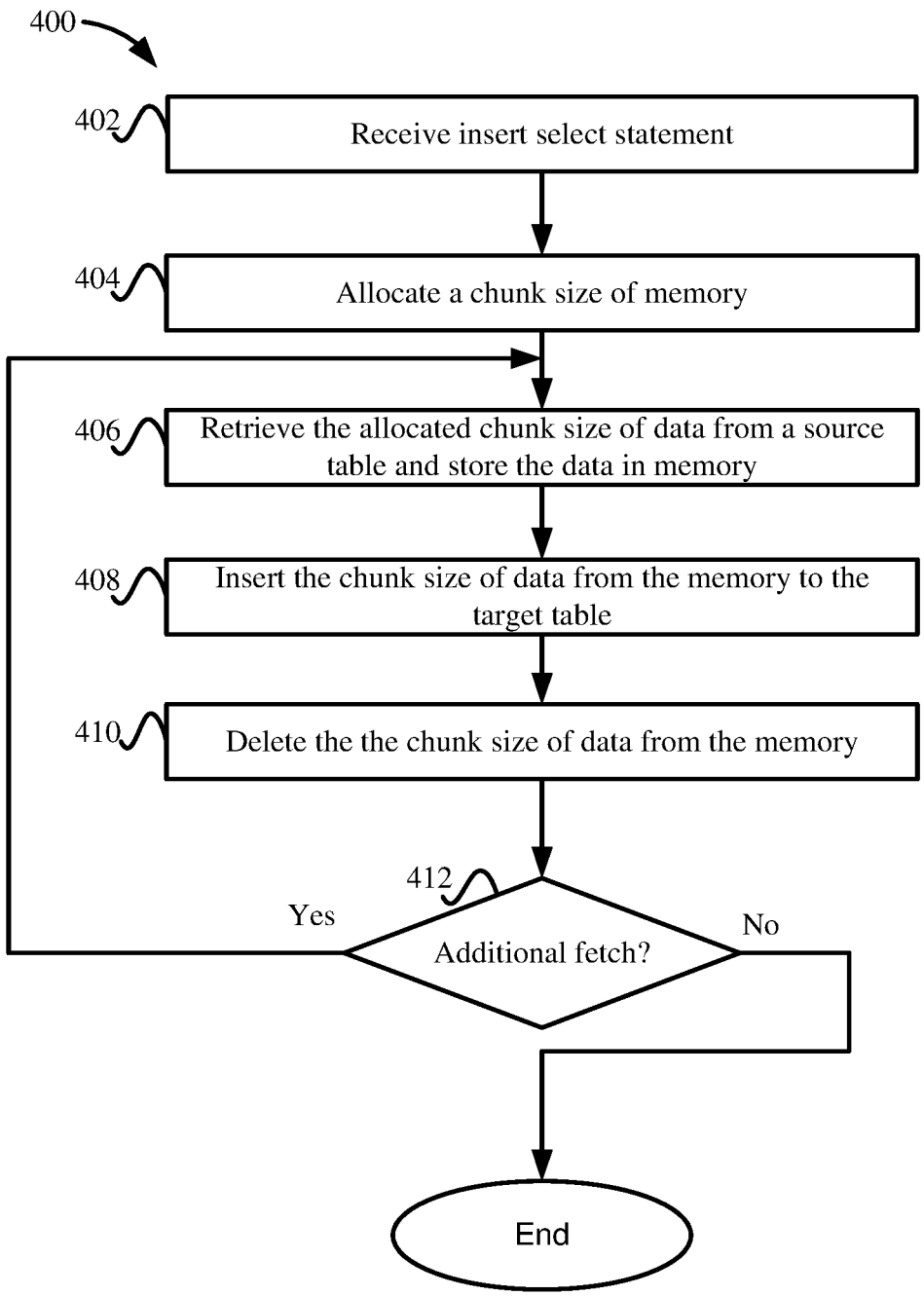
FIG. 4 depicts a simplified flowchart of a method for performing the pipelined search to retrieve and insert data according to some embodiments.

FIG. 4 depicts a simplified flowchart 400 of a method for performing the pipelined search to retrieve and insert data according to some embodiments. At 402, engine 108 receives an INSERT-subSELECT statement. The INSERT-subSELECT statement may be part of a larger query, or be the only statement requested by a query. The INSERT-subSELECT statement may have a source of a remote virtual table and a target of a local table.

At 404, SELECT-PART engine 206 may allocate a chunk size of memory. For example, SELECT-PART engine 206 allocates X number of bytes in memory 216. In some embodiments, the number of bytes may be pre-defined, such as one megabyte, 10 megabytes, 100 megabytes, etc. Also, the number of bytes may be based on the size of the source table or the amount of local memory available. For example, the percentage of the source table may be used or a percentage of available local memory.

At 406, SELECT-PART engine 206 retrieves a pre-defined chunk size of data from a source table in a database system 110 in remote sources 114. Engine 108 receives data from a source table and stores the data in the allocated pre-defined chunk size of memory in memory 216.

Then, at 408, INSERT-PART engine 208 inserts the chunk size of data from memory 216 into target table 116. Thereafter, at 410, engine 108 deletes the chunk size of data from memory 216. The deletion clears the space in memory. In other examples, engine 108 may overwrite the pre-existing data in memory 216 with newly retrieved data and may not need to delete the data stored in the memory.

At 412, SELECT-PART engine 206 determines if an additional fetch of data is required. If not, the process ends. However, if so, the process reiterates to 406 to retrieve another chunk size of data from the source table, and the fetched data is stored in memory 216. Because the data from the previous fetch was deleted, SELECT-PART engine 206 can store an additional pre-defined chunk size of data that was fetched in memory 216. Then, INSERT-PART engine 208 stores the additional fetched data in target table 116. For example, INSERT-PART engine 208 may sequentially store pre-defined chunk sizes of data in target table 116. Different methods may be used to sequentially insert the data, such as INSERT-PART engine 208 may retain a pointer to the last inserted data in target table 116, and then insert the next fetched data thereafter.

In some embodiments, data access layer 112 may offer a function that performs the iterative fetch of pre-defined chunk sizes of data from the target table. For example, a fetch_size( ) application programming interface (API) may receive an INSERT-subSELECT statement for the source table with a fetch size, and sequentially fetch the chunk size of data from the source table. Database access layer 112 may then sequentially return the chunk size of data to engine 108.

Accordingly, engine 108 may perform the fetch of remote data for the chunk size multiple times while inserting the fetched data multiple times and clearing the chunk size of memory after each insertion. Thus, the entire transfer from the source table to the target table uses only an allocated amount of memory and not the entire memory of the source table.

Memory Usage

Figure 5:
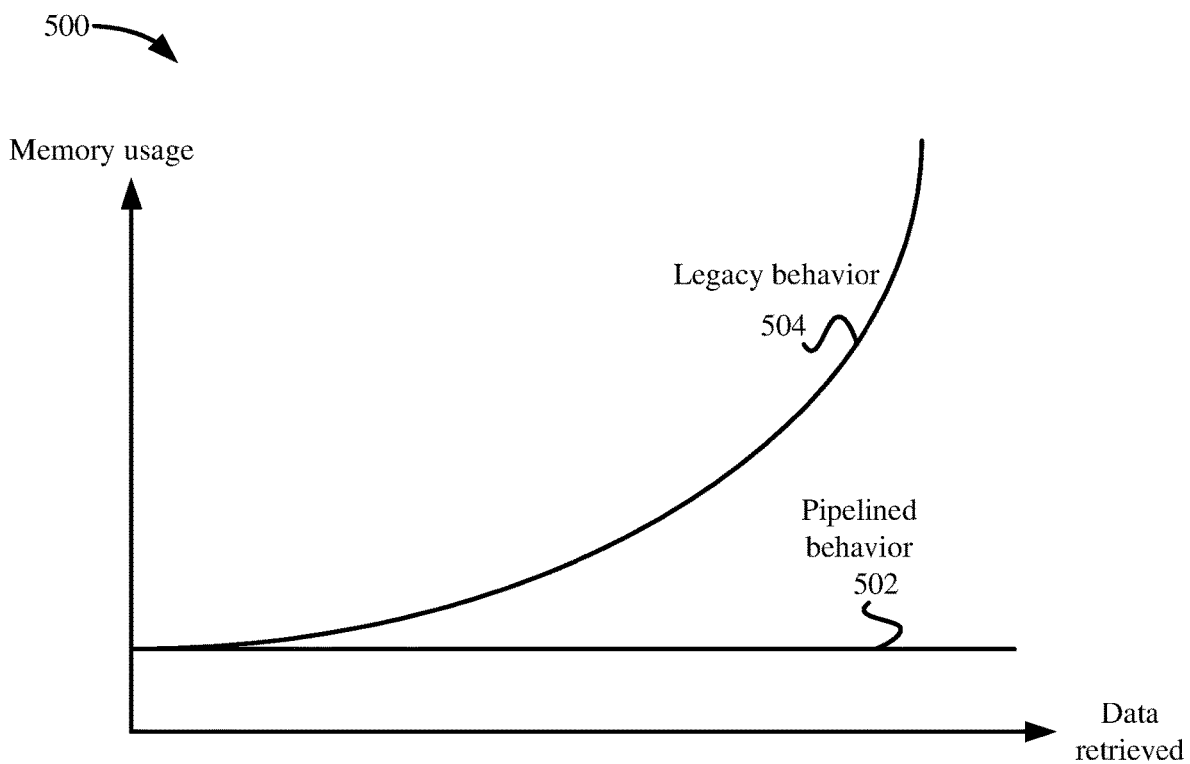
FIG. 5 shows a graph of memory usage and data retrieved according to some embodiments.

FIG. 5 shows a graph 500 of memory usage and data retrieved according to some embodiments. For example, the Y axis of graph 500 is memory usage and the X axis of graph 500 is data retrieved. For the legacy behavior, when the pipelined search is not used, at 504, as the data retrieved increases, the amount of memory usage also increases. However, using the pipelined behavior, at 502, the amount of memory usage is constant as the amount of data retrieved increases. The elapsed time to transfer the source table to the target table is also very similar using the legacy behavior and the pipelined behavior.

Conclusion

Accordingly, when a transfer of data from a remote source 114 to a local target table is performed, pipelined search optimally uses local memory when transferring the data from the source table to the target table. When memory is restricted, such as in a cloud environment, the use of the pipelined behavior saves memory usage and may also save the cost. Further, the performance of processing the INSERT-subSELECT operation may not be impacted significantly.

System

In some embodiments, a method for retrieving data, the method comprising: receiving, by a computing device, a query to retrieve data from a source table and insert the data into a target table; allocating, by the computing device, a size of memory; retrieving, by the computing device, a portion of the data from the source table based on the size of memory; storing, by the computing device, the retrieved portion of the data from the source table in the memory; storing, by the computing device, the retrieved portion of the data stored in the memory into the target table; and continuing, by the computing device, to retrieve portions of data from the source table in increments based on the size of memory, store the retrieved portions of data in the memory, and store the retrieved portions of data from the memory in the target table until the data from the source table has been inserted into the target table.

In some embodiments, the source table is located in a remote source that is remote from the target table.

In some embodiments, the source table is stored in a first database format that is different from a second database format for the target table.

In some embodiments, an adapter is used to access the portion of data in the source table.

In some embodiments, the size of memory that is allocated is pre-defined.

In some embodiments, the size of memory that is allocated is less than a size of the source table.

In some embodiments, the size of memory that is allocated is equal to the portion of data.

In some embodiments, the memory is local to the target table.

In some embodiments, the method further comprising: deleting the portion of data in the memory before storing another portion of data from the source table in the memory.

In some embodiments, the method further comprising: overwriting the portion of data in the memory before storing another portion of data from the source table in the memory.

In some embodiments, retrieving the portion of the data from the source table based on the size of memory comprises: using a virtual table to access the source table, wherein the source table is remote.

In some embodiments, the query includes an insert statement to retrieve data from the source table and insert the data into the target table.

In some embodiments, the query includes an INSERT-subSELECT that retrieves data from the source table and inserts the data into the target table.

In some embodiments, a non-transitory computer-readable storage medium containing instructions, that when executed, control a computer system to be operable for: receiving a query to retrieve data from a source table and insert the data into a target table; allocating a size of memory; retrieving a portion of the data from the source table based on the size of memory; storing the retrieved portion of the data from the source table in the memory; storing the retrieved portion of the data stored in the memory into the target table; and continuing to retrieve portions of data from the source table in increments based on the size of memory, store the retrieved portions of data in the memory, and store the retrieved portions of data from the memory in the target table until the data from the source table has been inserted into the target table.

In some embodiments, the source table is located in a remote source that is remote from the target table.

In some embodiments, the source table is stored in a first database format that is different from a second database format for the target table.

In some embodiments, the size of memory that is allocated is pre-defined.

In some embodiments, the size of memory that is allocated is less than a size of the source table.

In some embodiments, the method further comprising: deleting the portion of data in the memory before storing another portion of data from the source table in the memory.

In some embodiments, an apparatus for retrieving data, the apparatus comprising: one or more computer processors; and a non-transitory computer-readable storage medium comprising instructions, that when executed, control the one or more computer processors to be operable for: receiving a query to retrieve data from a source table and insert the data into a target table; allocating a size of memory; retrieving a portion of the data from the source table based on the size of memory; storing the retrieved portion of the data from the source table in the memory; storing the retrieved portion of the data stored in the memory into the target table; and continuing to retrieve portions of data from the source table in increments based on the size of memory, store the retrieved portions of data in the memory, and store the retrieved portions of data from the memory in the target table until the data from the source table has been inserted into the target table.

System

Figure 6:
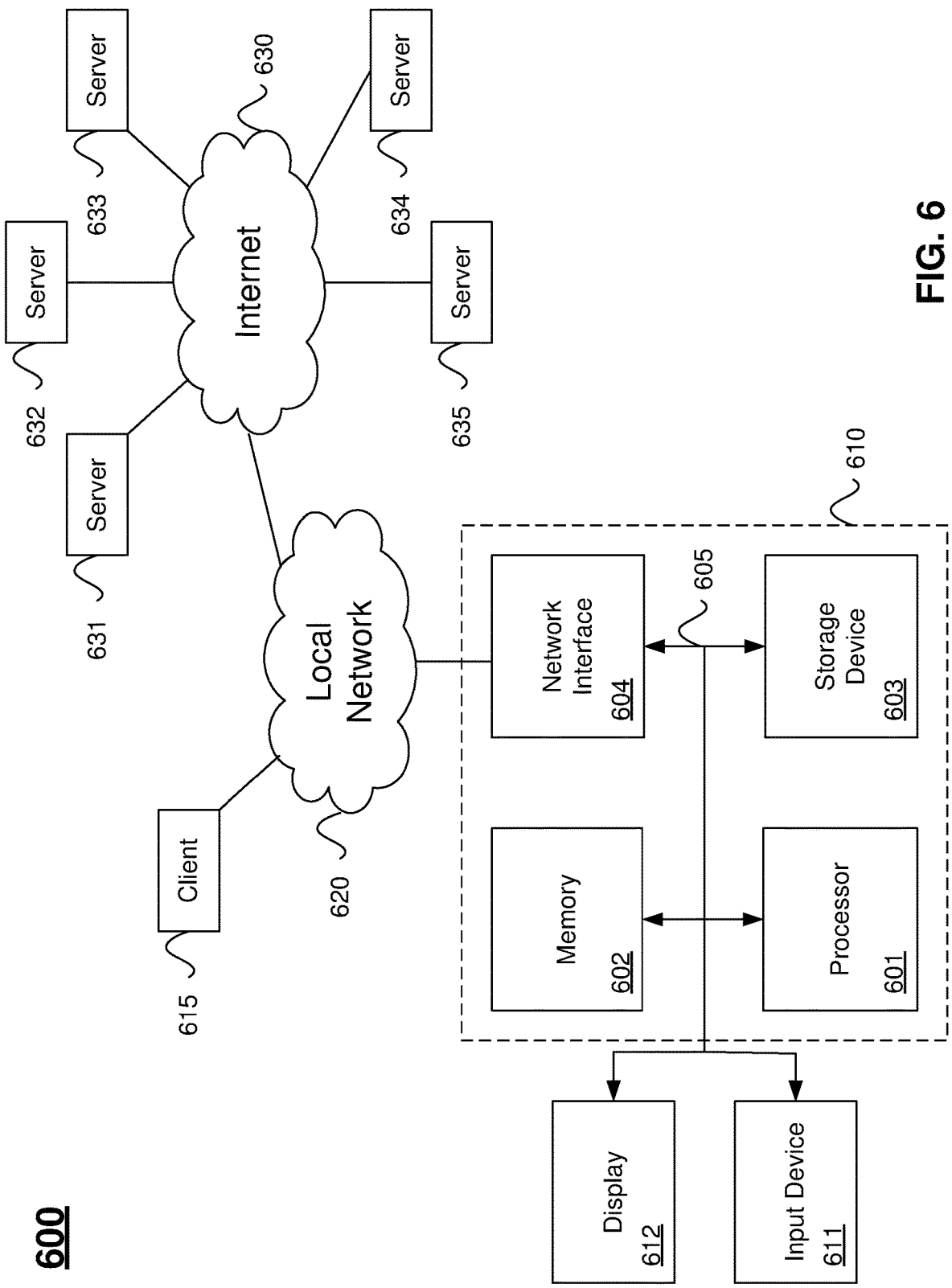
FIG. 6 illustrates hardware of a special purpose computing machine according to one embodiment.

FIG. 6 illustrates hardware of a special purpose computing machine according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610, clients 615, or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for retrieving data, the method comprising:
   receiving, by a computing device, a query to retrieve data from a source table and insert the data into a target table;
   allocating, by the computing device, a size of memory;
   retrieving, by the computing device, a portion of the data from the source table based on the size of memory, wherein retrieving the portion of the data from the source table based on the size of memory comprises:
   using a virtual table to access the source table, wherein the source table is remote;
   storing, by the computing device, the retrieved portion of the data from the source table in the memory;
   storing, by the computing device, the retrieved portion of the data stored in the memory into the target table; and
   continuing, by the computing device, to retrieve portions of data from the source table in increments based on the size of memory, store the retrieved portions of data in the memory, and store the retrieved portions of data from the memory in the target table until the data from the source table has been inserted into the target table.

2. The method of claim 1, wherein the source table is located in a remote source that is remote from the target table.

3. The method of claim 1, wherein the source table is stored in a first database format that is different from a second database format for the target table.

4. The method of claim 3, wherein an adapter is used to access the portion of data in the source table.

5. The method of claim 1, wherein the size of memory that is allocated is pre-defined.

6. The method of claim 1, wherein the size of memory that is allocated is less than a size of the source table.

7. The method of claim 1, wherein the size of memory that is allocated is equal to the portion of data.

8. The method of claim 1, wherein the memory is local to the target table.

9. The method of claim 1, further comprising:
   deleting the portion of data in the memory before storing another portion of data from the source table in the memory.

10. The method of claim 1, further comprising:
    overwriting the portion of data in the memory before storing another portion of data from the source table in the memory.

11. The method of claim 1, wherein the query includes an insert statement to retrieve data from the source table and insert the data into the target table.

12. The method of claim 1, wherein the query includes an INSERT-subSELECT that retrieves data from the source table and inserts the data into the target table.

13. A non-transitory computer-readable storage medium containing instructions, that when executed, control a computer system to be operable for:
   receiving a query to retrieve data from a source table and insert the data into a target table;
   allocating a size of memory;
   retrieving a portion of the data from the source table based on the size of memory, by using a virtual table to access the source table, wherein the source table is remote;
   storing the retrieved portion of the data from the source table in the memory;

storing the retrieved portion of the data stored in the memory into the target table; and continuing to retrieve portions of data from the source table in increments based on the size of memory, store the retrieved portions of data in the memory, and store the retrieved portions of data from the memory in the target table until the data from the source table has been inserted into the target table.

14. The non-transitory computer-readable storage medium of claim 13, wherein the source table is located in a remote source that is remote from the target table.

15. The non-transitory computer-readable storage medium of claim 13, wherein the source table is stored in a first database format that is different from a second database format for the target table.

16. The non-transitory computer-readable storage medium of claim 13, wherein the size of memory that is allocated is pre-defined.

17. The non-transitory computer-readable storage medium of claim 13, wherein the size of memory that is allocated is less than a size of the source table.

18. The non-transitory computer-readable storage medium of claim 13, further comprising:

deleting the portion of data in the memory before storing another portion of data from the source table in the memory.

19. An apparatus for retrieving data, the apparatus comprising:

one or more computer processors; and a non-transitory computer-readable storage medium comprising instructions, that when executed, control the one or more computer processors to be operable for:

receiving a query to retrieve data from a source table and insert the data into a target table;

allocating a size of memory;

retrieving a portion of the data from the source table based on the size of memory, by using a virtual table to access the source table, wherein the source table is remote;

storing the retrieved portion of the data from the source table in the memory;

storing the retrieved portion of the data stored in the memory into the target table; and continuing to retrieve portions of data from the source table in increments based on the size of memory, store the retrieved portions of data in the memory, and store the retrieved portions of data from the memory in the target table until the data from the source table has been inserted into the target table.

20. The apparatus of claim 19, wherein the source table is located in a remote source that is remote from the target table.

* * * * *